US010885345B2

(12) United States Patent
Gong

(10) Patent No.: US 10,885,345 B2
(45) Date of Patent: Jan. 5, 2021

(54) END-TO-END VIDEO CAPTIONING WITH MULTI-TASK REINFORCEMENT LEARNING

(71) Applicant: TENCENT AMERICA LLC, Palo Alto, CA (US)

(72) Inventor: Boqing Gong, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 114 days.

(21) Appl. No.: 16/396,924

(22) Filed: Apr. 29, 2019

(65) Prior Publication Data

US 2020/0342236 A1  Oct. 29, 2020

(51) Int. Cl.
*G06K 9/00* (2006.01)
*G06N 20/00* (2019.01)
*G06N 3/08* (2006.01)
*G06K 9/62* (2006.01)

(52) U.S. Cl.
CPC ..... *G06K 9/00751* (2013.01); *G06K 9/00718* (2013.01); *G06K 9/6262* (2013.01); *G06N 3/08* (2013.01); *G06N 20/00* (2019.01)

(58) Field of Classification Search
CPC .......... G06K 9/00751; G06K 9/00718; G06K 9/6262; G06N 3/08; G06N 20/00
See application file for complete search history.

(56) References Cited

U.S. PATENT DOCUMENTS

| 10,198,671 | B1* | 2/2019 | Yang | G06K 9/3233 |
|---|---|---|---|---|
| 10,699,129 | B1* | 6/2020 | Jiang | G06K 9/00751 |
| 10,726,059 | B1* | 7/2020 | Ren | G06K 9/4604 |
| 10,733,876 | B2* | 8/2020 | Moura | G06K 9/00785 |
| 2017/0127016 | A1* | 5/2017 | Yu | G06N 3/0445 |
| 2017/0337924 | A1* | 11/2017 | Yu | G06K 9/624 |
| 2018/0144248 | A1* | 5/2018 | Lu | G06K 9/481 |
| 2018/0189572 | A1* | 7/2018 | Hori | G06F 16/783 |
| 2019/0149834 | A1* | 5/2019 | Zhou | H04N 19/60 348/473 |
| 2019/0304437 | A1* | 10/2019 | Qian | G10L 15/063 |
| 2020/0193297 | A1* | 6/2020 | Verhoef | G06F 17/18 |

OTHER PUBLICATIONS

Hendricks et al., Deep Compositional Captioning: Describing Novel Object Categories without Paired Training Data. (Year: 2016).*
Guo et al., Improving Reinforcement Learning Based Image Captioning with Natural Language Prior. (Year: 2018).*
(Continued)

*Primary Examiner* — John B Strege
(74) *Attorney, Agent, or Firm* — Sughrue Mion, PLLC

(57) ABSTRACT

A method of training a captioning model used to perform automatic video captioning of an input video, including initializing, by at least one processor, a plurality of long short-term memory (LSTM) units included in the captioning model using cross-entropy loss; training, by the at least one processor, the LSTM units using reinforcement learning; training, by the at least one processor, the LSTM units and a plurality of convolutional neural networks (CNNs) included in the captioning model using multitask training; and generating, by the at least one processor, a video caption corresponding to the input video using the captioning model.

20 Claims, 5 Drawing Sheets

(56) References Cited

OTHER PUBLICATIONS

Pasunuru et al., Reinforced Video Captioning with Entailment Rewards. (Year: 2017).*
Shen et al., Weakly Supervised Dense Video Captioning. (Year: 2017).*
Sudhakaran et al. Learning to Detect Violent Videos using Convolutional Long Short-Term Memory, IEEE (Year: 2017).*
Wang et al., Video Captioning via Hierarchical Reinforcement Learning (Year: 2018).*
Pasanuru et al. Multi-task Video Captioning with Video and Entailment Generation (Year: 2017).*

* cited by examiner

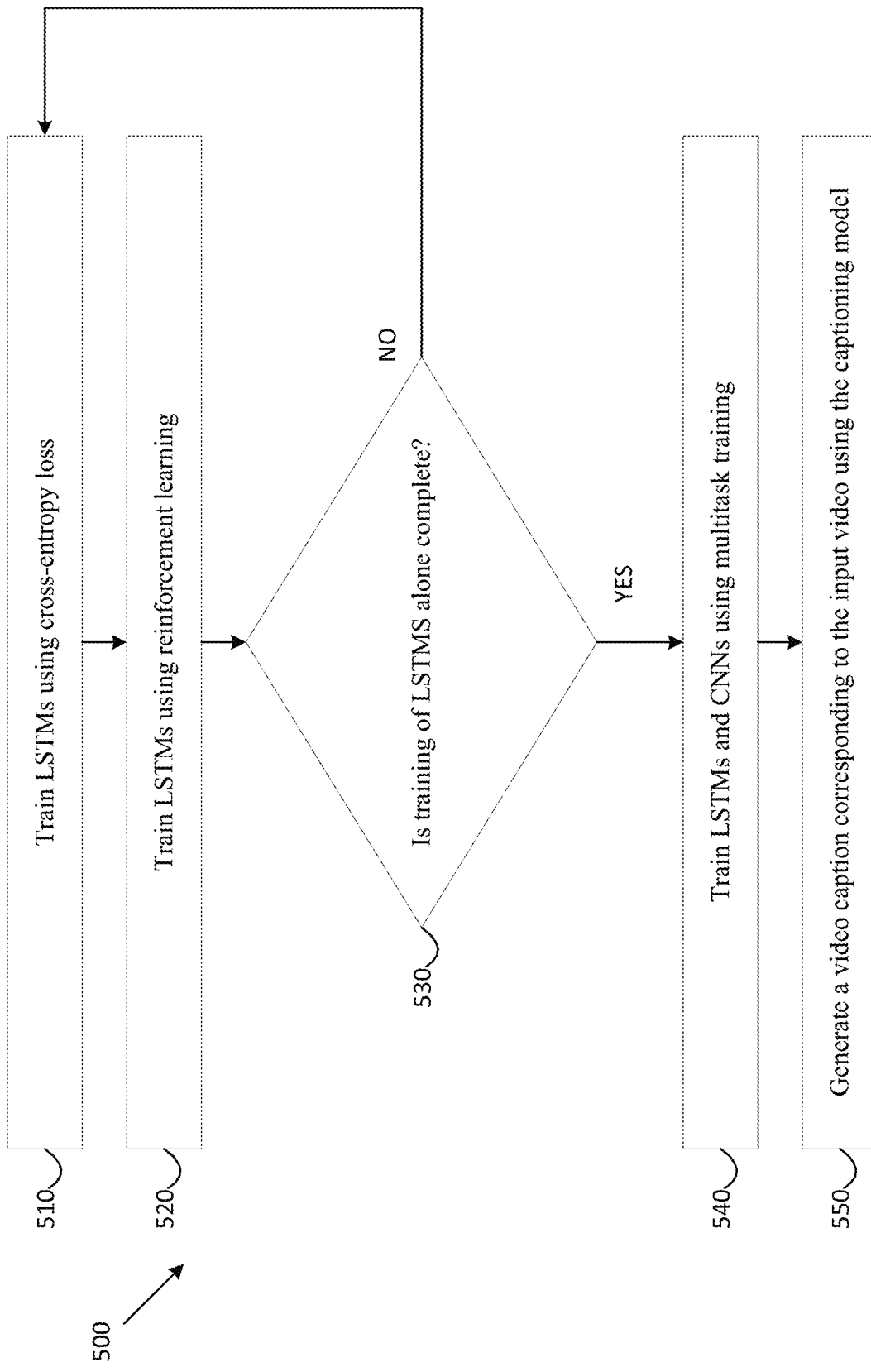

END-TO-END VIDEO CAPTIONING WITH MULTI-TASK REINFORCEMENT LEARNING

BACKGROUND

Video captioning is vital for many downstream applications such as video retrieval, indexing, browsing, etc. Existing approaches to video captioning are trained component by component. The quality of the whole system is hindered by each individual component's performance.

The related art end-to-end (E2E) training is often impeded by hardware constraints, e.g., graphics processing unit (GPU) memory, and is prone to overfitting. With respect to video captioning, those limitations are especially amplified by the fact that both the input videos and output captions are lengthy sequences. Indeed, state-of-the-art methods for video captioning process video frames by convolutional neural networks and generate captions by unrolling recurrent neural networks. If these are connected in an E2E manner, the resulting model is both memory-consuming and data-hungry, making it extremely hard to train.

Large amount of progress has been made in image and video captioning. A large part of it is due to the advances in machine translation. For example, the encoder-decoder framework and the attention mechanism were first introduced in machine translation and then extended to captioning. Both image captioning approaches and video captioning methods follow their pipeline and also apply attention mechanism in caption generation. Compared to image captioning, video captioning describes dynamic scenes instead of static scenes.

As can be seen in FIG. 1, video captioning is much more difficult with large variance in appearance. Some related art techniques propose boundary-aware LSTM cells to automatically detect the temporal video segments. Some related art techniques integrate natural language knowledge to their network by training language LSTM model on a large external text dataset. Some related art techniques extend Gated Recurrent Unit (GRU) to multirate GRU to handle different video frame rates. Some related art techniques propose a deep compositional captioner to describe novel object with the help of lexical classifier training on external image description dataset. Recently, maximum likelihood estimation algorithm has been used in video captioning which maximizes the probability of current words based on the previous ground truth words. However, all of these approaches have two major problems.

First is exposure bias, which is the input mis-match in training and inference. In training, the output of decoder depends on ground truth words instead of model predictions. While in inference, the decoder only has access to the predictions. Some related art techniques scheduled sampling to mitigate the gap between the training and inference by selecting more often from the ground truth in the beginning but sampling more often from the model predictions in the end. However, it still optimizes at the word level.

Another problem is the objective mismatch between training and inference. In training, loss is optimized at the word level. While in inference, discrete metrics such as BLEU4, METEOR, CIDEr, and ROUGE-L may be used for evaluation. A few image captioning works have been proposed to solve the problems and shown superior performance with the help of reinforcement learning. Some related art techniques introduce actor-critic method to image captioning and also propose a new lookahead inference algorithm which has better performance than beam search. Some related art techniques employ policy gradient method to optimize the SPIDEr score. Some related art techniques combine a conditional generative adversarial network with policy gradient which can produce natural and diverse sentences. However, there are much less works using reinforcement learning in video captioning.

Many video captioning models can actually be deployed in an E2E manner. Some related art techniques propose a stack of two long short-term memory (LSTM) networks. Some related art techniques propose a transfer unit to feed the semantic concept to LSTM. Some related art techniques. develop a high-level word detector and semantic attention mechanism which combines the concept with caption decoder. However, they actually treat a convolutional neural networks (CNN) as a feature extractor, and do not train the CNN part of their framework, and do not train the CNN and the other parts together.

Multitask learning is a kind of machine learning technique. During multitask learning, multiple tasks are solved at the same time with a shared representation and is especially useful with limited number of original data. It has been utilized not only in computer vision, but also in natural language processing. However, few related art techniques use multitask learning in video captioning.

SUMMARY

In an embodiment, there is provided a method a method of training a captioning model used to perform automatic video captioning of an input video, the method including initializing, by at least one processor, a plurality of long short-term memory (LSTM) units included in the captioning model using cross-entropy loss; training, by the at least one processor, the LSTM units using reinforcement learning; training, by the at least one processor, the LSTM units and a plurality of convolutional neural networks (CNNs) included in the captioning model using multitask training; and generating, by the at least one processor, a video caption corresponding to the input video using the captioning model.

In an embodiment, there is provided an apparatus for training a captioning model used to perform automatic video captioning of an input video, the apparatus including at least one memory configured to store program code; and at least one processor configured to read the program code and operate as instructed by the program code, the program code including initializing code configured to cause the at least one processor to initialize a plurality of long short-term memory (LSTM) units included in the captioning model using cross-entropy loss; first training code configured to cause the at least one processor to train the LSTM units using reinforcement learning; second training code configured to cause the at least one processor to train the LSTM units and a plurality of convolutional neural networks (CNNs) included in the captioning model using multitask training; and generating code configured to cause the at least one processor to generate a video caption corresponding to the input video using the captioning model In an embodiment, there is provided a non-transitory computer-readable medium storing instructions that, when executed by at least one processor of a device for training a captioning model used to perform automatic video captioning of an input video, cause the at least one processor to initialize a plurality of long short-term memory (LSTM) units included in the captioning model using cross-entropy loss; train the LSTM units using reinforcement learning; train the LSTM units and a plurality of convolutional neural networks (CNNs) included in the captioning model using multitask training; and generate a video caption corresponding to the input video using the captioning model.

BRIEF DESCRIPTION OF THE DRAWINGS

FIG. 5 is a flowchart of a method for training a captioning model used to perform automatic video captioning of an input video, according to an embodiment.

DETAILED DESCRIPTION

Embodiments of the present disclosure may relate to an E2E training method for video captioning with the enabling factors of multi-task learning and reinforcement learning, which may be the first video captioning system trained in the E2E fashion. Embodiments of the present disclosure may provide state-of-the-art results on several benchmark datasets.

Embodiments of the present disclosure relate to an end-to-end (E2E) training method used to jointly optimize different components of a video captioning system used to perform automatic video captioning of an input video. As described herein, video captioning may relate to automatically generating a descriptive sentence or phrase for a short video clip. In embodiments, the video clip may be, for example, 10-20 seconds long.

According to embodiments, a multitask reinforcement learning approach to training an E2E captioning model, for example a video captioning model may be used. Multitask learning may be used because, for example, the model capacity likely outweighs the existing datasets when all of its weights are updated from the raw video input to the caption output. This multitask reinforcement learning approach can mine and construct effective tasks, for example attributes, rewards, and the captions, from a human captioned videos such that they can jointly regulate the search space of the E2E neural net-work, from which an E2E video captioning model can be found and generalized to a testing phase. Embodiments may be trained end-to-end from the raw video input to the caption output.

Related art approaches to video captioning may train the components of the systems separately. However, embodiments of the present disclosure optimize the whole system end-to-end. Experimental results show that such a model outperforms related art models by a large margin on several benchmark video captioning datasets.

Embodiments of the E2E trained video captioning model described herein may include a deepened version of the S2VT model. Despite its simplicity in concept, it is very challenging to train the entire model to reach a good generalization capability onto the test sets. Experimental results indicate that a gain from jointly training the convolutional neural networks (CNNs) and long short-term networks (LSTMs) may be marginal over fixing the CNNs as feature extractors, if an effective training approach is not used. Therefore, embodiments described herein may be useful when they are combined for training an E2E video captioning model.

Figure 1:
FIG. 1 is an illustration of an input video for video captioning.
Figure 1:
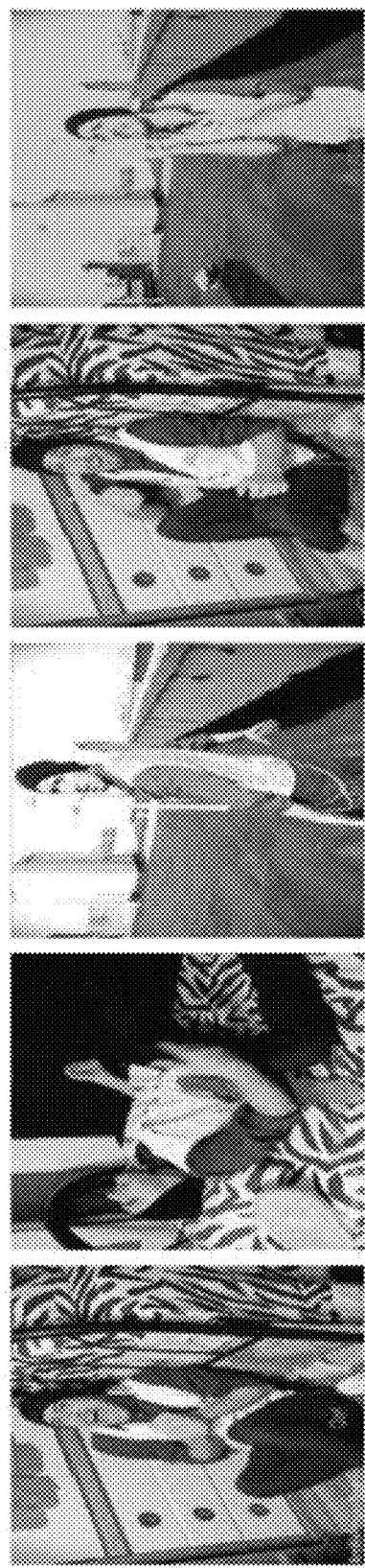
Figure 2:
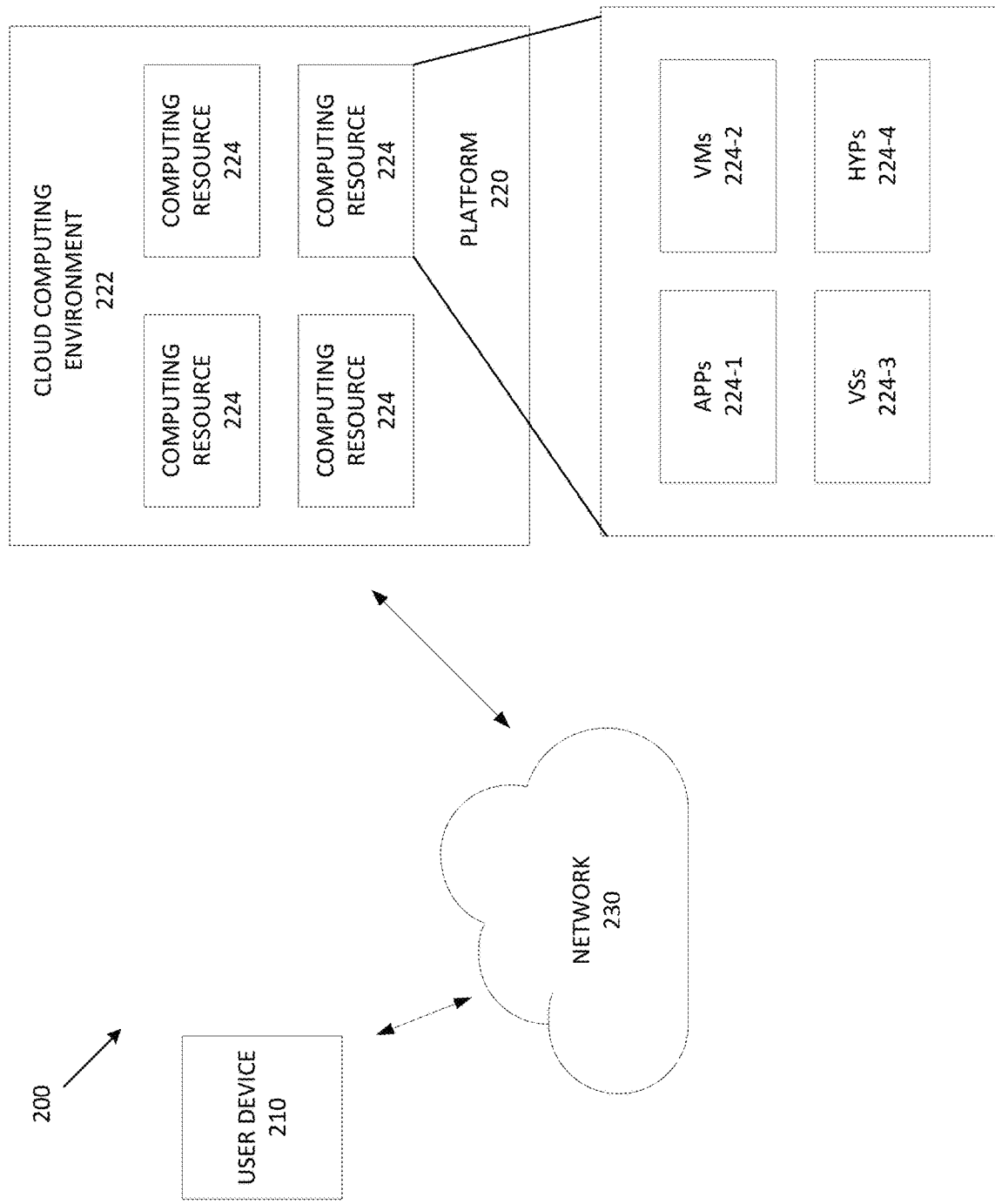
FIG. 2 is a diagram of an environment in which methods, apparatuses and systems described herein may be implemented, according to embodiments.

The E2E approach to training the video captioning pipeline, may include, according to embodiments, developing auxiliary tasks to help the training of the main task, i.e., video captioning. The approach may further include automatic mining of attributes from the video captions for constructing auxiliary attribute prediction tasks, and using evaluation metrics as reward functions for defining auxiliary reinforcement learning tasks FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of selecting an optimal LMW used to perform automatic speech recognition, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
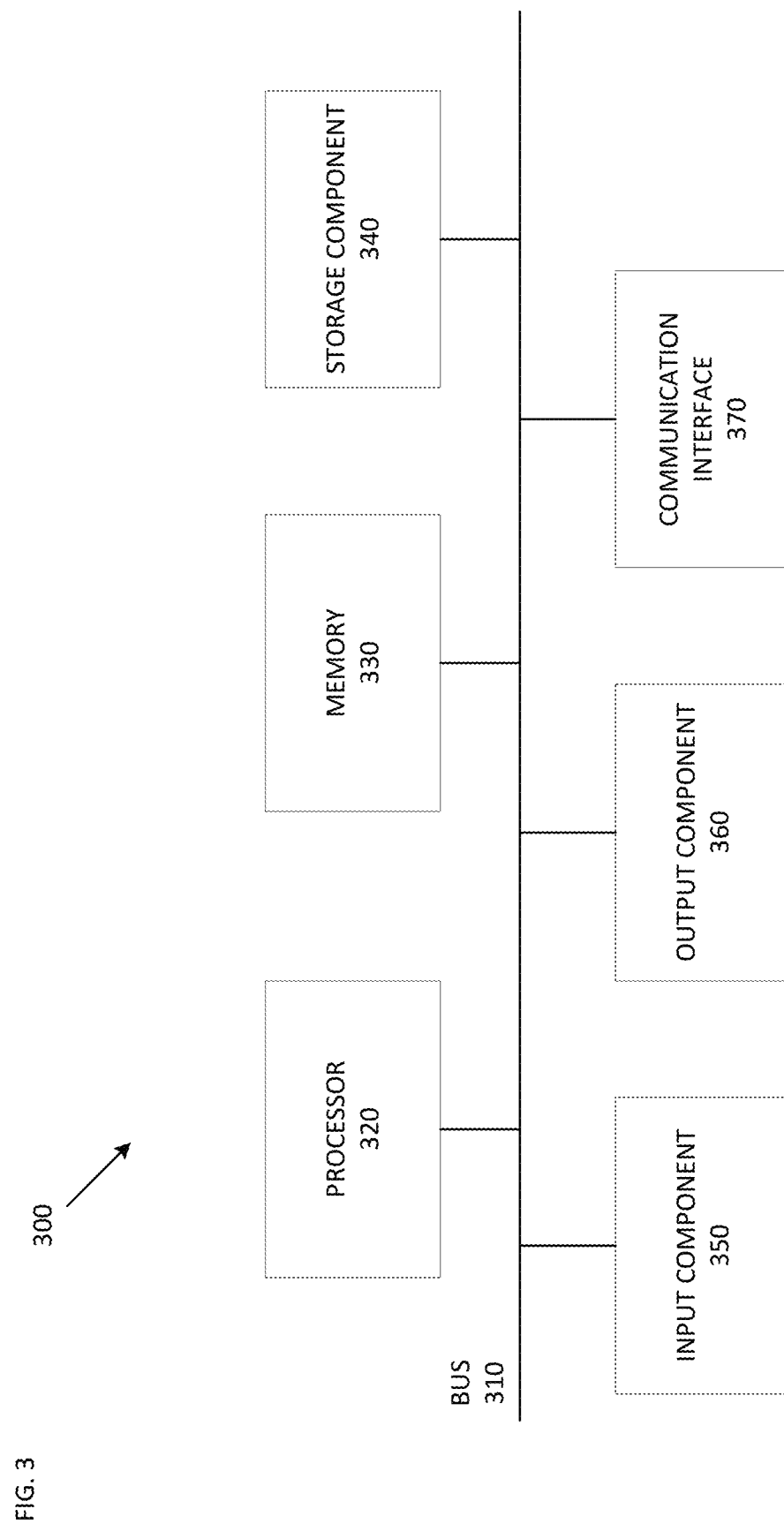
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
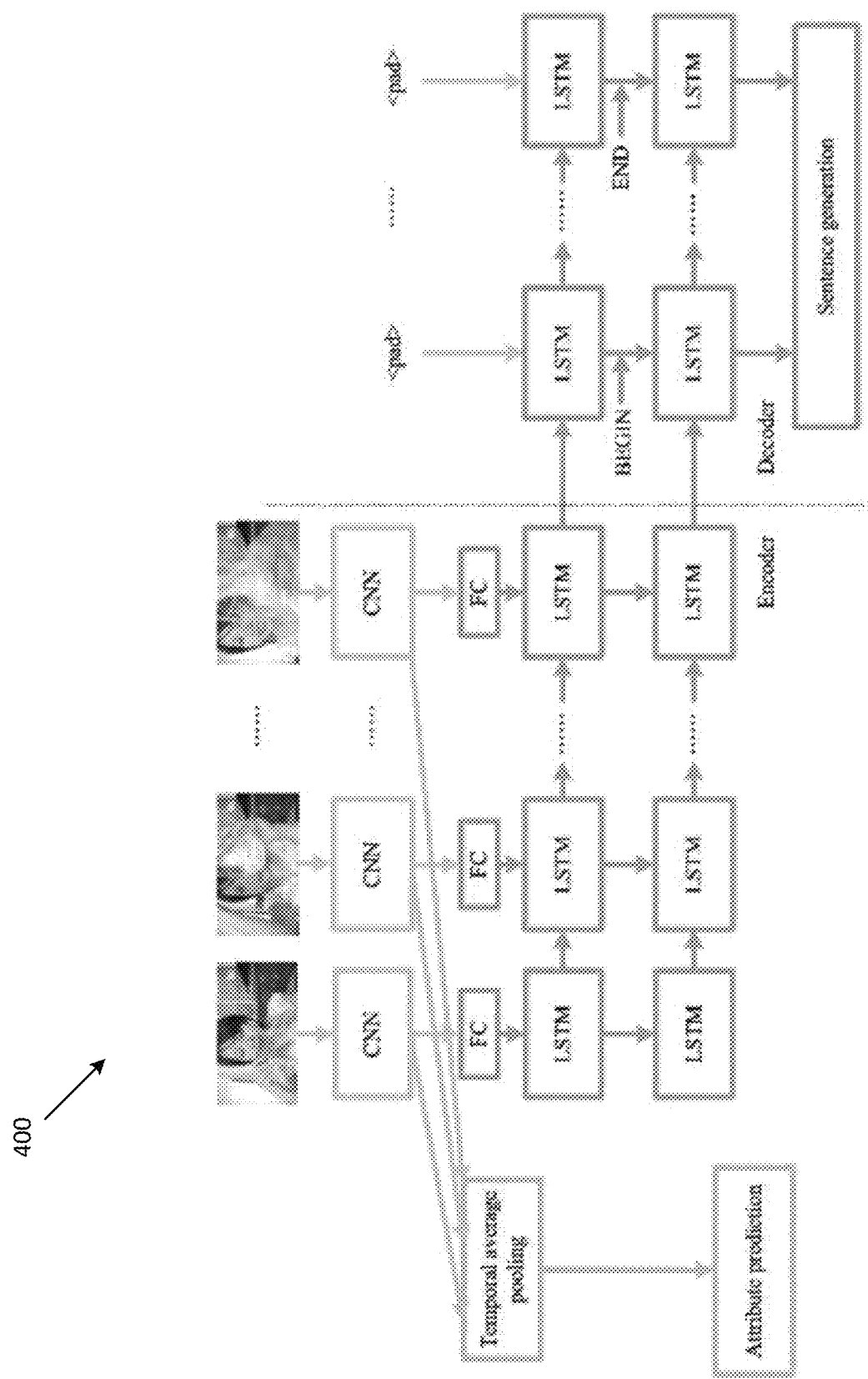
FIG. 4 is diagram illustrating a video captioning model used to perform automatic video captioning of an input video, according to an embodiment.

FIG. 4 shows a diagram of a model architecture 400 which may include three main components. According to embodiments, model architecture 400 may correspond to the video captioning model described herein.

At a top of model architecture 400, five copies of the same Inception-Resnet-v2 CNN may be used to transform the raw video frames to high-level feature representations. The last classification layer of the Inception-Resnet-v2 may be replaced by a fully connected layer whose out-put dimension is, for example, 500. The LSTMs on a bottom of model architecture 400 may first encode the video frames' feature representations and then de-code a sentence to describe the content in the video. On a bottom left of the model architecture 400, a branch includes a temporal average pooling layer and an attribute prediction layer. Model architecture 400 may extract a number of attributes, for example up to 400 attributes. Accordingly, the attribute prediction layer's output dimension may be 400 and the activation functions may be sigmoid. This branch may be introduced to assign relevant attributes to an input video. In embodiments, this branch may be not used in the testing phase of the video captioning, but this branch may generate informative gradients in the training phase for updating the weights of the CNNs in addition to those from the LSTMs. The design of the LSTM, for example, the number of hidden units, how to compute the input gates, etc., may be borrowed from S2VT.

FIG. 5 is a flowchart of a method 500 of training a video captioning model used to perform automatic video captioning of an input video, according to embodiments. In some implementations, one or more process blocks of FIG. 5 may be performed by platform 220. In some implementations, one or more process blocks of FIG. 5 may be performed by another device or a group of devices separate from or including platform 220, such as user device 210.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

In embodiments, the video captioning model may be trained progressively in three steps. The first two steps may be used to find a good initialization to the LSTMs, and the fully connected layer connecting the CNNs and the LSTMs, such that the last step, the E2E training of the whole model, can have a warm start. The weights of the CNNs may be frozen until the third step. In embodiments, the first two steps may correspond to, for example, operation 510 and operation 520 of method 500 of FIG. 5, and the third step may correspond to operation 540 of FIG. 5.

As shown in FIG. 5, in operation 510, the method 500 may include initializing, by at least one processor, a plurality of long short-term memory (LSTM) units included in the captioning model using cross-entropy loss.

As an example, operation 510 may include a training approach based on S2VT using cross-entropy loss. In embodiments, an input frame $i_t$ at time step t, may be encoded with the deep CNN and embedded with projection matrix $W_f$. Then for the projected feature representation $x_t$, the LSTM computes the hidden state $h_t$ and cell state $c_t$. The details about the computation of hidden state and cell state may be shown in Equation 1:

$$i_t = \sigma(W_{ix}x_t + W_{ih}h_{t-1} + b_i)$$

$$f_t = \sigma(W_{fx}x_t + W_{fh}h_{t-1} + b_f)$$

$$o_t = \sigma(W_{ox}x_t + W_{oh}h_{t-1} + b_o)$$

$$g_t = \varphi(W_{gx}x_t + W_{gh}h_{t-1} + b_g)$$

$$c_t = i_t \odot g_t + f_t \odot c_{t-1}$$

$$h_t = o_t \odot \varphi(c_t) \qquad \text{(Equation 1)}$$

where $\sigma$ is the sigmoid function, $\varphi$ is the hyperbolic tangent function, $\odot$ is element-wise multiplication. The second LSTM layer may be similar to the first one, except that the input may be the combination of the first LSTM layers output and the word embeddings.

Given a "groundtruth" sentence $s^* = \{w_1^*, w_2^*, \ldots w_T^*\}$ describing an input video, the cross-entropy loss may be minimized as shown in Equation 2:

$$L_x(\theta) := -\log p_\theta(s^*) = -\frac{1}{T}\sum_{t=1}^{T}\log p_\theta(w_t^* \mid w_1^*, \ldots, w_{t-1}^*) \qquad \text{(Equation 2)}$$

where $\theta$ denotes the model parameters.

As further shown in FIG. 5, method 500 may include training, by the at least one processor, the LSTM units using reinforcement learning at operation 520.

In embodiments, operation 520 may include REINFORCE+ training of the LSTMs. After operation 510, self-critical REINFORCE algorithms may be introduced to the video captioning to seek better weights for the LSTMs in terms of their generalization performance on the validation and test sets. Cross-entropy loss may expose the recurrent LSTMs under different data distributions in the training and test stages because it feeds the model groundtruth words which are only available in training. Moreover, the loss function may not be a good proxy for the evaluation metrics. To address these challenges, the captioning model may be directly optimized by REINFORCE learning.

In reinforcement learning, an agent may be trained to complete tasks by executing a series of actions in an environment. As an example, in a video captioning context, the goal of the captioning model may be to generate a proper sentence upon observing the video input. The captioning model may correspond to the agent and the action may be to predict the next word at each time step. The input video with user annotated captions may correspond to the environment. The reward for the agent's action may be defined as the actual evaluation metric used in the test stage. In particular, the CIDEr score may be used the as reward. In embodiments, the reinforcement learning pipeline for video captioning may operate as follows: an agent receives an observation about the environment which contains the visual features and groundtruth words up to current step, as well as a reward, for example the CIDEr score, from the environment; the agent then takes an action to predict a word; the environment provides another state, for example revealing one more groundtruth word, and a reward in response to the agent's action.

The objective function of reinforcement learning may be shown in Equation 3:

$$L_T(\theta) = \mathbb{E}(r(w^s)) \quad \text{(Equation 3)}$$

where $w^s$ is the sentence consisting of $(w_1, w_2, w)$ sampled from the network and r is the reward function.

In order to solve the above problem, the REINFORCE algorithm may be used again. The general updates of the parameter θ may be be written as Equation 4:

$$\nabla_\theta L_r(\theta) = -\mathbb{E}[r(w)\nabla \log p(w^s)] \quad \text{(Equation 4)}$$

where $p(w^s)$ is basically determined by the video captioning model $p\theta(w^s)$ (cf eq. (2)). In practice, the expectation is approximated by a sample mean which incurs variance to the gradients. To reduce the variance, the reward r is often calibrated by a baseline b, as shown in Equation 5:

$$\nabla_\theta L_r(\theta) = -\mathbb{E}[(r(w^s)-b)\nabla_\theta \log p_\theta(w^s)] \quad \text{(Equation 5)}$$

where it is obvious that the gradient remains unchanged since the baseline b does not depend on the sampled words $w^s$. How to choose the baseline b can affect the performance of the REINFORCE algorithm. We choose the reward of the greedily inferred words as our baseline. Denoting by $\hat{w}_t := \arg\max p_\theta(w_t|h_t)$ the baseline may be $r(\hat{w}^s)$.

A one-sample approximation to Equation 5 may be represented as Equation 6:

$$\nabla_\theta L_r(\theta) \approx -(r(w^s)-b)\nabla_\theta \log p_\theta(w^s) \quad \text{(Equation 6)}$$

which may further be seen as the following cost function.

At the beginning of each iteration, up to M trajectories, for example sentences, may be sampled up from the current model. Denoting them by $s_1, \ldots, s_M$, the cost function for generating the gradients of this iteration may be represented as Equation 7:

$$L_r(\theta) \approx -\frac{1}{M}\sum_{m=1}^{M}(r(s_m)-b)\log p_\theta(s_m) \quad \text{(Equation 7)}$$

where $r(s_m)$ is the reward assigned to the trajectory $s_m$. We denote this algorithm as REINFORCE+ or RFC+ in the following.

Equation 7 may acts as a running loss over the full course of the training. It changes at different iterations, being realized by the sampled trajectories as opposed to the constant groundtruth captions in the cross-entropy loss Lx across different iterations. Moreover, the rewards offset by the baseline dynamically weigh the contributions of the trajectories to the gradients. Jointly, they may push the model trained in operation 510 further to the point that it generalizes better to the unseen data.

In embodiments, the reinforcement learning may include receiving visual features of the input video, at least one groundtruth word provided by the captioning model in a previous step, and a reward associated with the at least one groundtruth word, providing, a new groundtruth word, receiving a new reward associated with the new groundtruth word, and changing at least one weight of the plurality of LSTMs based on the new reward.

As further shown in FIG. 5, method 500 may include determining whether the training of the LSTMs is completed at operation 530.

As further shown in FIG. 5, method 500 may include training, by the at least one processor, the LSTM units and a plurality of convolutional neural networks (CNNs) included in the captioning model using multitask training at operation 540.

In embodiments, weights of the CNNs are frozen during the initializing of the LSTM units and the reinforcement learning, and the weights of the CNNs are freed during the multitask training.

In embodiments, operation 540 may include jointly tuning the full model, freeing the weights of the CNNs. As the starting point, it might seem natural to repeat the above operations, for example operation 510 and operation 520, for the E2E optimization. However, this may only give rise to marginal gain over freezing the CNNs weights, according to experimental results. Such quick saturation of accuracy may be common for very deep neural networks and may be alleviated by the skip connections between different layers of feedforward networks. However, heterogeneously mixing LSTMs and CNNs, leaving it unclear how to apply the skip connections.

Instead, in embodiments, extra and informative gradients may be supplied directly to the CNNs, so as to complement those reached to the CNNs indirectly through the LSTMs. Such direct gradients are provided by the attribute prediction branch as shown in FIG. 4.

In embodiments, the attribute prediction branch may mine the attributes in the video captions following the previous practice on image captioning. Among the words in the sentences of the training set, the most frequent words including nouns, verbs and adjectives, may be extracted as the attributes. Accordingly, the attribute prediction branch may be equipped by sigmoid functions in order to predict the existence or not (yi) of each attribute in the input video. A binary cross entropy loss for this network branch, may be denoted by Equation 8:

$$L_a(\theta) = -\frac{1}{N}\sum_i [y_i \log q_\theta(i) + (1-y_i)\log(1-q_\theta(i))] \quad \text{(Equation 8)}$$

where N is the number of attributes in total and qθ (i) is the network output for the $i^{th}$ attribute.

In embodiments, the overall cost function used in operation 540 may be a convex combination of the attribute loss and the REINFORCE loss as shown in Equation 9:

$$L(\theta) = \alpha L_r(\theta) + (1-\alpha)L_\alpha(\theta) \quad \text{(Equation 9)}$$

where α=0.95 is selected by the validation set.

Accordingly, in embodiments, the method 500 may further include receiving, by the at least one processor, an output of the captioning model, mining, by the at least one processor, attributes of the output using an attribute prediction branch of the video captioning model, training, by the at least one processor, the plurality of CNNs based on the mined attributes, wherein the attributes include at least one from among a noun, verb, or adjective included in the output.

As further shown in FIG. 5, method 500 may include generating, by the at least one processor, a video caption corresponding to the input video using the captioning model at operation 550.

In embodiments, the generating of the video caption may include transforming, by the at least one processor, the input video into a plurality of feature representations using the plurality of CNNs, encoding, by the at least one processor, the plurality of feature representations using the plurality of LSTM units, and decoding, by the at least one processor, the encoded plurality of feature representations using the plurality of LSTM units to provide a sentence describing a content of the input video.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of training a captioning model used to perform automatic video captioning of an input video, the method comprising:
   initializing, by at least one processor, a plurality of long short-term memory (LSTM) units included in the captioning model using cross-entropy loss;
   training, by the at least one processor, the LSTM units using reinforcement learning;
   training, by the at least one processor, the LSTM units and a plurality of convolutional neural networks (CNNs) included in the captioning model using multitask training; and
   generating, by the at least one processor, a video caption corresponding to the input video using the captioning model.

2. The method of claim 1, wherein weights of the CNNs are frozen during the initializing of the LSTM units and the reinforcement learning.

3. The method of claim 2, wherein the weights of the CNNs are freed during the multitask training.

4. The method of claim 1, wherein the generating of the video caption comprises:
   transforming, by the at least one processor, the input video into a plurality of feature representations using the plurality of CNNs;
   encoding, by the at least one processor, the plurality of feature representations using the plurality of LSTM units; and
   decoding, by the at least one processor, the encoded plurality of feature representations using the plurality of LSTM units to provide a sentence describing a content of the input video.

5. The method of claim 1, wherein the initializing further comprises:
   receiving, by the at least one processor, an input frame $i_t$ at time step t;
   encoding, by the at least one processor, the input frame $i_t$ it using the plurality of CNNs;
   embedding, by the at least one processor, the encoded input frame $i_t$ with projection matrix $W_i$;
   computing, by the at least one processor, a hidden state $h_t$ and cell state $c_t$ corresponding to a feature representation $x_t$ of the embedded encoded input frame $i_t$ using the plurality of LSTMs.

6. The method of claim 5, wherein the hidden state $h_t$ and the cell state $c_t$ are computed as follows:

$$i_t = \sigma(W_{ix}x_t + W_{ih}h_{t-1} + b_i)$$

$$f_t = \sigma(W_{fx}x_t + W_{fh}h_{t-1} + b_f)$$

$$o_t = \sigma(W_{ox}x_t + W_{oh}h_{t-1} + b_o)$$

$$g_t = \varphi(W_{gx}x_t + W_{gh}h_{t-1} + b_g)$$

$$c_t = i_t \odot g_t + f_t \odot c_{t-1}$$

$$h_t = o_t \odot \varphi(c_t)$$

wherein $\sigma$ represents a sigmoid function, $\varphi$ represents a hyperbolic tan-gent function, and $\odot$ represents element-wise multiplication.

7. The method of claim 1, wherein the reinforcement learning comprises:
   receiving, by the at least one processor, visual features of the input video, at least one groundtruth word provided by the captioning model in a previous step, and a reward associated with the at least one groundtruth word;
   providing, by the at least one processor, a new groundtruth word;
   receiving, by the at least one processor, a new reward associated with the new groundtruth word;
   changing, by the at least one processor, at least one weight of the plurality of LSTMs based on the new reward.

8. The method of claim 1, wherein a cost function $L_r(\theta)$ used to perform the reinforcement learning is represented as follows:

$$L_r(\theta) \approx -\frac{1}{M}\sum_{m=1}^{M}(r(s_m)-b)\log p_\theta(s_m),$$

wherein p represents the captioning model, θ represents parameters of the captioning model, M represents a number of a plurality of trajectories, m represents an index of the plurality of trajectories, $s_m$ represents a trajectory of the plurality of trajectories, and $r(s_m)$ represents a reward assigned to the trajectory $s_m$.

9. The method of claim 1, further comprising:
receiving, by the at least one processor, an output of the captioning model;
mining, by the at least one processor, attributes of the output using an attribute prediction branch of the video captioning model;
training, by the at least one processor, the plurality of CNNs based on the mined attributes,
wherein the attributes include at least one from among a noun, verb, or adjective included in the output.

10. The method of claim 9, wherein a binary cross entropy loss function $L_a(\theta)$ used in the attribute prediction branch is represented as follows:

$$L_a(\theta) = -\frac{1}{N}\sum_i [y_i\log q_\theta(i) + (1-y_i)\log(1-q_\theta(i))],$$

wherein θ represents parameters of the captioning model, N is a number of the attributes, i represents an index of the attributes, y, indicates an existence of an attribute within the input video, and $q_\theta(i)$ represents an output of the captioning model for an $i^{th}$ attribute.

11. An apparatus for training a captioning model used to perform automatic video captioning of an input video, the apparatus comprising:
at least one memory configured to store program code; and
at least one processor configured to read the program code and operate as instructed by the program code, the program code including:
initializing code configured to cause the at least one processor to initialize a plurality of long short-term memory (LSTM) units included in the captioning model using cross-entropy loss;
first training code configured to cause the at least one processor to train the LSTM units using reinforcement learning;
second training code configured to cause the at least one processor to train the LSTM units and a plurality of convolutional neural networks (CNNs) included in the captioning model using multitask training; and
generating code configured to cause the at least one processor to generate a video caption corresponding to the input video using the captioning model.

12. The apparatus of claim 11, wherein weights of the CNNs are frozen during the initializing of the LSTM units and the training of the LSTM units using the reinforcement learning.

13. The apparatus of claim 12, wherein the weights of the CNNs are freed during the multitask training.

14. The apparatus of claim 11, wherein the generating code further comprises:
transforming code configured to cause the at least one processor to transform the input video into a plurality of feature representations using the plurality of CNNs;
encoding code configured to cause the at least one processor to encode the plurality of feature representations using the plurality of LSTM units; and
decoding code configured to cause the at least one processor to decode the encoded plurality of feature representations using the plurality of LSTM units to provide a sentence describing a content of the input video.

15. The apparatus of claim 11, wherein the initializing code comprises:
receiving code configured to cause the at least one processor to receive an input frame $i_t$ at time step t;
encoding code configured to cause the at least one processor to encode the input frame $i_t$ it using the plurality of CNNs;
embedding code configured to cause the at least one processor to embed the encoded input frame $i_t$ with projection matrix $W_i$;
computing code configured to cause the at least one processor to compute a hidden state $h_t$ and cell state $c_t$ corresponding to a feature representation $x_t$ of the embedded encoded input frame $i_t$ using the plurality of LSTMs.

16. The apparatus of claim 11, wherein the first training code comprises:
first receiving code configured to cause the at least one processor to receive visual features of the input video, at least one groundtruth word provided by the captioning model in a previous step, and a reward associated with the at least one groundtruth word;
providing code configured to cause the at least one processor to provide a new groundtruth word;
second receiving code configured to cause the at least one processor to receive a new reward associated with the new groundtruth word;
changing code configured to cause the at least one processor to change at least one weight of the plurality of LSTMs based on the new reward.

17. The apparatus of claim 11, wherein a cost function $L_r(\theta)$ used to perform the reinforcement learning is represented as follows:

$$L_r(\theta) \approx -\frac{1}{M}\sum_{m=1}^{M}(r(s_m)-b)\log p_\theta(s_m),$$

wherein p represents the captioning model, θ represents parameters of the captioning model, M represents a number of a plurality of trajectories, m represents an index of the plurality of trajectories, $s_m$ represents a trajectory of the plurality of trajectories, and $r(s_m)$ represents a reward assigned to the trajectory $s_m$.

18. The apparatus of claim 11, further comprising:
receiving code configured to cause the at least one processor to receive an output of the captioning model;
mining code configured to cause the at least one processor to mine attributes of the output using an attribute prediction branch of the video captioning model;
third training code configured to cause the at least one processor to train the plurality of CNNs based on the mined attributes, wherein the attributes include at least one from among a noun, verb, or adjective included in the output.

19. The apparatus of claim 18, wherein a binary cross entropy loss function $L_a(\theta)$ used in the attribute prediction branch is represented as follows:

$$L_a(\theta) = -\frac{1}{N}\sum_i [y_i \log q_\theta(i) + (1 - y_i)\log(1 - q_\theta(i))],$$

wherein $\theta$ represents parameters of the captioning model, N is a number of the attributes, i represents an index of the attributes, $y_i$ indicates an existence of an attribute within the input video, and $q_\theta(i)$ represents an output of the captioning model for an $i^{th}$ attribute.

20. A non-transitory computer-readable medium storing instructions that, when executed by at least one processor of a device for training a captioning model used to perform automatic video captioning of an input video, cause the at least one processor to:
  initialize a plurality of long short-term memory (LSTM) units included in the captioning model using cross-entropy loss;
  train the LSTM units using reinforcement learning;
  train the LSTM units and a plurality of convolutional neural networks (CNNs) included in the captioning model using multitask training; and
  generate a video caption corresponding to the input video using the captioning model.

* * * * *